Figure 2:
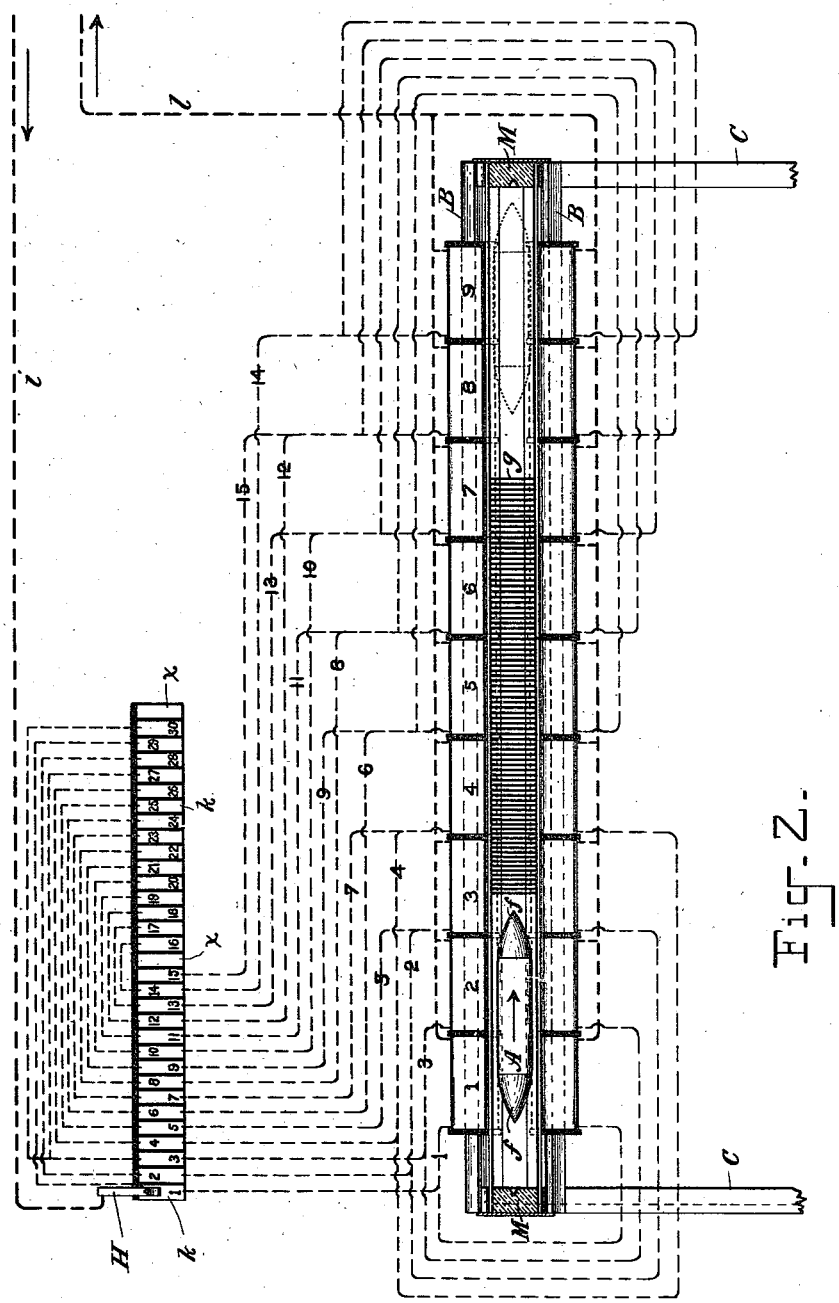

(No Model.)
2 Sheets—Sheet 1.
L. W. LOMBARD.
ELECTRIC SHUTTLE MOTION FOR LOOMS.
No. 514,087.
Patented Feb. 6, 1894.
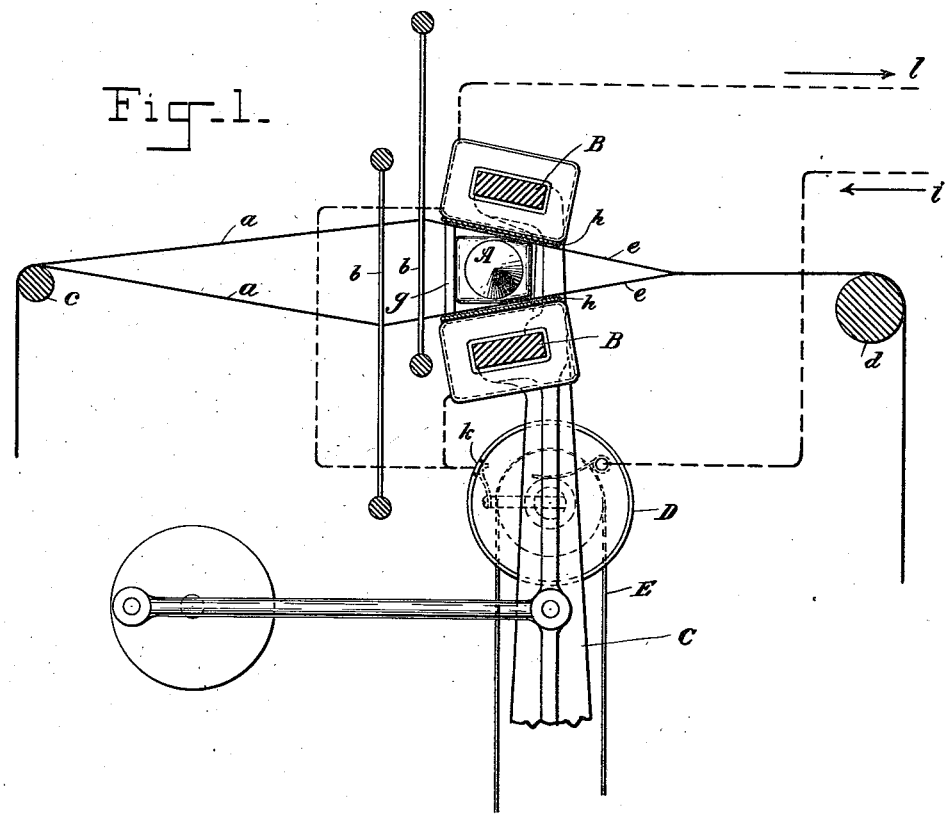
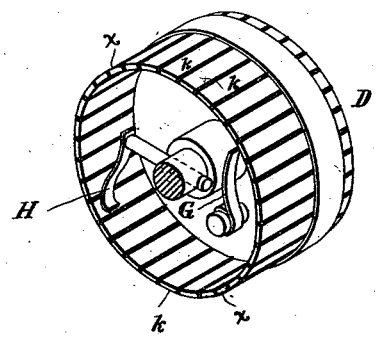
Witnesses.
John F. Nelson.
Charles F. Stephenson.
Inventor.
Levi W. Lombard.

(No Model.)

L. W. LOMBARD.
ELECTRIC SHUTTLE MOTION FOR LOOMS.

No. 514,087.    Patented Feb. 6, 1894.

Witnesses.
John F. Nelson.
Charles H. Stephenson

Inventor.
Levi W. Lombard

UNITED STATES PATENT OFFICE.

LEVI W. LOMBARD, OF LYNN, MASSACHUSETTS, ASSIGNOR TO B. F. SPINNEY AND J. N. SMITH, OF SAME PLACE.

ELECTRIC SHUTTLE-MOTION FOR LOOMS.

SPECIFICATION forming part of Letters Patent No. 514,087, dated February 6, 1894.

Application filed March 18, 1893. Serial No. 466,681. (No model.)

*To all whom it may concern:*

Be it known that I, LEVI W. LOMBARD, a citizen of the United States, and a resident of Lynn, in the county of Essex and State of Massachusetts, have invented a certain new and useful Electric Shuttle-Motion for Looms, of which the following is a specification.

My invention relates to looms or other apparatus in which a shuttle is employed.

The invention consists essentially in the combination with the shuttle, constructed to operate as an armature, of an actuating magnet or magnets fixed or stationary with relation to the traverse or throw of the shuttle, and means for varying or changing the condition of the magnet to cause the shuttle to traverse the shed.

In a loom constructed in accordance with my invention the use of pickers or of any mechanism moving with the shuttle throughout the throw or traverse as in prior constructions may be dispensed with.

My invention is applicable to looms in which the shuttle reciprocates in the shed as well as to circular looms, but it will be sufficient to describe it as embodied in a loom having a reciprocating shuttle from which its application to a circular loom will be obvious. The fixed magnet or magnets operating on the shuttle is or are constructed to have a field or range of magnetic action substantially co-extensive with the throw of the shuttle; that is, adapted to keep the armature shuttle subject to the magnetic action through its whole traverse, and I preferably cause the shuttle to traverse under the influence of the magnets by combining with the magnet or magnets a suitable commutator controlling the circuits of the energizing coils therefor, whereby the active magnetic field operating on the shuttle may be caused to shift or traverse the shuttle race and thereby carry the shuttle with it. Nevertheless I do not wish to be understood as limiting myself to the use of a commutator constructed to operate upon coils of a suitable magnet or magnets in a manner to cause such traverse of magnetism, as electro-magnets might be combined in other ways with the shuttle, being stationary with relation thereto in such manner as to keep the shuttle under constant magnetic action during its whole traverse without, however, causing a progressive shifting of the magnetism through the series of electro-magnets. I prefer in general, however, to use a series of electro magnets or a sectional electro-magnet and a commutator properly constructed to shift the active magnetic field thereof.

While I have described my invention as embodied in a loom having a commutator and electro-magnet coils whose circuits are controlled by such commutator in a manner to progressively shift the field of magnetic action, I wish to be understood as not limiting myself to a commutator, as any other means known to electricians for causing a progressive shifting of magnetic polarity in a coil or coils and in a direction parallel to the shuttle race for the purpose of operating on a shuttle constituting an armature, may be employed without departing from my invention.

By the term armature as herein used, I mean any device adapted to move by the influence of a magnetic or electric field from one point to another, the armature constituting in the combination the shuttle of the loom.

While I have hereinafter described one particular arrangement of circuits and commutator for changing or varying the electrical activity in the coils of the actuating magnets, I do not limit myself to such special arrangement or combination. The commutator may be operated in any desired manner, but I prefer to make it mechanically independent of the shuttle and to operate such commutator by any desired mechanism connected with the loom mechanism and timed to complete its cycle of actions upon the magnet in correspondence with the changes of the shed.

Another feature of my invention relating to the particular construction or organization in which the invention is herein shown as embodied, consists in a continuously rotating commutator having its series of contacts repeated two or more times in a circle of rotation but reversed at each repetition of the series in the circuit, whereby the commutator may rotate continuously in the same direction while the magnetism is caused to reciprocate to carry the shuttle along with it.

The invention relates also to the particular disposition of the magnets with relation to the shuttle race, to the combination with the shuttle constituting an armature of two magnets or series of magnets arranged respectively above and below the shed, to the combination with the shuttle constituting an armature of an actuating magnet or magnets carried by the swinging batten or lay, and to other features more particularly hereinafter described and then specified in the claims.

While I have shown and described my invention as carried out by the employment of two magnets or sets of magnets parallel to one another and to the shuttle race, it will be readily understood that any number of magnets might be used in the same way, and I do not therefore confine myself to two but may use any number, one or more.

In the accompanying drawings:—Figure 1, is a sectional elevation transverse to the line of movement of the shuttle, and through that portion of a loom to which my invention is applied. Fig. 2, is a side elevation of the actuating magnets and shuttle together with a diagram of the circuit connections of the commutator and the magnet coils. Fig. 3, is a perspective view of a form of commutator.

In the drawings $a, a$, indicate the warp threads, $b, b$, the heddles, $c$, the warp beam, $d$, the cloth beam and $e$, the shed.

$A$, is the shuttle constructed to operate as the armature for the magnet or magnets for which purpose it may be tipped with any suitable magnetic material as well understood in the art. I prefer to apply the iron or other material at or near the opposite ends of the shuttle, as shown, though it might be applied or combined with the shuttle at other points. It is desirable, however, to employ two separate armatures, where the actuating coils of the electro-magnets are brought into operation in the order hereinafter described to cause the shuttle to be acted upon first at one end and then at the other. The use of armatures at opposite ends is sometimes desirable where long shuttles are employed as it diminishes the amount of iron or similar material that it is necessary to employ, and also causes the shuttle to be sustained at opposite ends or at a number of points, thereby steadying its movement. The iron tips or armatures of the shuttle are indicated at $f$.

The actuating magnet herein shown is composed of two series of electro-magnetic coils, each series nine in number, disposed preferably as shown with their axes parallel to the shuttle race. The two series are disposed as indicated, above and below the shed, and while it would be possible to employ but one series, I prefer, for obvious reasons, to employ at least two. If one series only were employed, it would be preferably located above the shed in order to take the weight of the shuttle as far as possible off the warp threads. Where, however, the two series of electromagnetic coils are employed the same effect of keeping the shuttle from bearing upon the lower threads of the shed with any considerable degree of pressure is secured to a certain extent as the tendency of the magnets is to center the armature in the space between them. As will be obvious, therefore, the action when either one or two magnets, or series of magnets, are employed extending along the whole shuttle race, is to sustain in whole or in part the weight of the shuttle and prevent it from wearing upon the threads.

The magnet coils are preferably wound on an iron core common to the series, though I do not wish to be understood as limiting myself to the use of electro-magnets with iron cores but may use them either with or without. The iron cores for said coils, and coils themselves, are preferably oblong in cross-outline, as indicated in Fig. 1, and the cores which are indicated at B, B, may constitute cross bars or rods of the swing batten or lay frame C, C.

The reed splits of the batten or lay swing with the frame in the usual way, and are indicated at $g$. They may be mounted or supported in any desired manner on the lay or batten, but are here shown as uniting the magnets, which disposition or arrangement of them is more particularly claimed in another application for patent filed by me March 13, 1893, Serial No. 466,682.

As will be obvious, by mounting the magnets on the swinging batten or lay, my invention may be applied to looms of ordinary construction with very little modification of the loom. The space between the magnets constitutes the shuttle race, and the shuttle may be of any desired outline, but preferably of the outline indicated in Fig. 1, in the end view of the same, the said shuttle being guided in the space between the magnets which, if desired, may be faced on the side next the shuttle race with plates indicated at $h$, adapted to support the warp threads. The electro-magnets as thus mounted, although they swing to and fro with the batten, are stationary with regard to the traverse or movement of the shuttle itself. The movement of the shuttle itself is obtained by a traverse of the magnetism in contradistinction to moving the magnet itself bodily along the shuttle race.

I do not limit myself to any particular means for progressively shifting the magnetism, but as before stated prefer to divide up the magnets into one or more sections and cause a progressive shifting of electrical activity of the coil sections by the operation of a proper commutator which is itself by preference though not necessarily, mechanically independent of the shuttle.

The commutator herein shown is indicated in Fig. 1, at D, and is continuously rotated by means of the belt E, or other mechanical connection with the loom or mechanism or power driving the loom.

In the shifting of magnetism which operates the armature shuttle from one end to the other of the race, the coil sections are brought into operation in the order (assuming that the shuttle moves in the direction of the arrow, Fig. 2,)—3, 2, 4, 3, 5, 4, 6, 5, 7, 6, 8, 7, 9, 8, and with the action of the last coil 8, the throw of the shuttle is completed. Its reverse movement is brought about through the coil 9, then coming into operation again, after which coil 7, acts, then 8, then 6, then 7, and so on reversely until the throw in the opposite direction is completed with the bringing of the coil 2, into action.

This particular order of energizing the sections of the magnet is brought about through the proper connections of the commutator segments to the several coils as will be now described.

$i$, is a feed wire connected with any suitable generator of electricity and joining the same with the commutator by means of a brush G, which bears on the hub of the rotating member of the commutator to which is connected a distributing brush H, as shown more clearly in Fig. 3. The brush H moves over the segments $k$, of the commutator in the usual fashion and thereby distributes current to the magnet coils or sections of coils, to one end of each of which coils connection is made from the commutator. From the opposite end of each of said coils connection is made with the return wire 1, as clearly shown in the diagram Fig. 2. The coil contacts 1 to 15, inclusive, correspond to the changes of connection produced after the manner before described in the traverse of the shuttle from one extreme to the other, and the contacts 16 to 30, correspond to the movement in the reverse direction. The brush H, moves continuously in the same direction; but the coil contacts 16 to 30, being connected as shown in the diagram, to the segments 1 to 15 inclusive in reverse order, the order of connecting to the coils produced by the movement of the brush H, is reversed so that there is in effect a rotating commutator whose contacts are repeated twice in the circle of rotation but reversed in order at the repetition of the connections in the second half of the circle of rotation. It is quite obvious that the number of repetitions of the coil contacts or segments $k$, might be more than two if desired, the reversal of the order or arrangement being adapted, however, at each repetition of the single series in the whole circle. A convenient way of constructing the commutator to produce these changes is to connect the segments $k$, numbered 16 to 30, with the segments numbered 1 to 15, but it is obvious that the connections of the segments themselves with the circuits of the coils might be made at other points without changing the action. The connecting wires leading from the segments 1 to 15, to the coils 1 to 9, are numbered correspondingly to those segments.

Assuming that the shuttle A, is moving in the direction of the arrow, and is in the position shown in Fig. 2, it will be seen by following the connections leading from the segments to the coils that said coils will be energized in the following order starting with the coil 3, which is connected with segment 5, upon which latter the brush H, is about to engage, viz:—3, 2, 4, 3, 5, 4, and so on until segment 14 is reached, when coil 9, will be energized and then when segment 15, is reached coil 8 will come into action, which latter will compel the throw of the shuttle by acting on the portion of armature $f$, at the rear of the shuttle. When the brush H, of the commutator passes from 15, to 16, then, by following the connections it will be observed that the coil 8, is cut out and coil 9 comes into operation, and thereby operates upon the portion of armature at the end of the shuttle next the stop, the shuttle being now in the position indicated in the dotted lines Fig. 2. The effect of this is to reverse the movement of the shuttle, and the reverse movement now goes on through the passage of the commutator brush H, onto the segments 17, &c., thereby energizing the other coils in the order, 7, 8, 6, 7, &c., until finally when the shuttle brings up against the stop at the opposite end of its traverse, the final action will be through the operation of the coil 2, brought into operation by contact 30, connected to segment 3. The reverse movement will now begin when the brush H, passes from 30, on to segment 1, and the operation will be repeated in obvious manner so long as the rotation of the commutator continues.

The details in the manner of connecting the coils to the commutator and the mechanical construction of the commutator are not described more specifically because the manner of construction is well understood in the art of electricity, and the construction and connections may be indefinitely varied without departing from the invention. At each end of its throw or traverse the shuttle engages with a stop indicated at M. Such stop I prefer to construct from rubber or similar material of proper character to cushion the blow of the shuttle. To provide for the change of the shed as well as to give time for the shuttle to rebound from the stop to take the position proper for its being acted upon by the magnets in a reverse direction, I provide the commutator with a "dwell" of any suitable kind in the changes of connection which it produces. Such a dwell may be furnished by interposing blank segments X X at the end of each series of contacts, as shown.

I do not claim herein a recoil stop for receiving the shuttle at the end of its traverse to store up the momentum thereof and assist in starting it on reverse movement as this feature forms the subject of broad claims in an application for patent filed by me March 20, 1893, Serial No. 466,878.

I do not limit myself to any particular number of electro-magnets having cores disposed parallel to one another and to the shuttle race as it is obvious that a greater or less number may be used as convenience may dictate.

What I claim as my invention is—

1. The combination with a loom shuttle constituting an armature, of an actuating magnet fixed or stationary with relation to the traverse or throw of the shuttle, and means for varying or changing the condition of the magnet to cause the shuttle to traverse the shed.

2. The combination with a shuttle constituting an armature, of an electric coil or coils, having a field of action embracing substantially the whole of the shuttle's path, and an electric switch or commutator controlling the circuit of said coil or coils for causing the shuttle to traverse without movement of said coil or coils.

3. The combination substantially as described, of a shuttle constituting an armature, a magnet or magnets co-extensive with the shuttle race, and means for progressively shifting the magnetism of said magnet or magnets in contradistinction to moving the magnet bodily or along the shuttle race to cause the shuttle to traverse.

4. The combination of a series of electro-magnets disposed along the shuttle race or path, a shuttle constituting an armature therefor, and a commutator controlling the circuit of said magnets for causing a progressive shifting of magnetism along the path of traverse of said shuttle.

5. The combination in a loom of a shuttle constituting an armature, an electro magnet or magnets having a field of action substantially co-extensive with the throw to be given to the shuttle, and means for changing or varying the electrical activity in the coils of said magnets in any way to actuate the shuttle.

6. The combination with a shuttle constituting an armature, of a magnet or magnets extending along the shuttle race or path above the same whereby the warp threads may be relieved of the weight of the shuttle.

7. In a loom, the combination with a shuttle constituting an armature, of means for producing a magnetic field both above and below the shuttle, as and for the purpose described.

8. In a loom, the combination of a shuttle constituting an armature and a magnetic field acting at opposite sides of the shuttle race or path.

9. In a loom, a shuttle constructed as an armature in combination with a magnet or magnets at opposite sides of the shed for causing the shuttle to traverse the shed.

10. In a loom, the combination of a magnet, means for causing a shifting or traverse of magnetism along the shuttle race or path without bodily traverse of said magnet, in combination with a shuttle operating as an armature in the field of said magnet and caused thereby to traverse its path or race, as and for the purpose described.

11. In a loom, the combination with a shuttle operating as an armature, an electro-magnet or magnets arranged parallel to the shuttle race or path for causing the same to traverse the shed, and a commutator or circuit changer mechanically independent of the shuttle itself for changing or varying the magnetic state of the actuating magnet or magnets.

12. In a loom, the combination with a shuttle operating as an armature, and an electro-magnet arranged parallel to the shuttle race or path for reciprocating said shuttle through the shed, of a continuously rotating commutator, controlling the circuit of said electro-magnet, as and for the purpose described.

13. In a loom, the combination with the shuttle constituting an armature, of an actuating coil or coils, and a commutator provided with a dwell at the point corresponding to the completion of the shuttle's throw or traverse.

14. The combination in a loom, of a shuttle constituting an armature, an actuating electro-magnet or magnets therefor mounted on the lay or batten and fixed or stationary with relation to the traverse or throw of the shuttle, and means for causing a traverse of the magnetism to cause the shuttle to traverse the shed.

15. The combination in a loom, of a shuttle constituting an armature, a magnet or series of magnets on a cross rod or bar of the batten or lay parallel to the shuttle race and fixed or stationary with relation to the traverse or throw of the shuttle, and means for causing a traverse of magnetism to cause the shuttle to traverse the shed.

16. In a loom, the combination with the shuttle constituting an armature, of the lay or batten, the cross bars or rods carried thereby above and below the shed parallel to the race, and an actuating magnet or magnets mounted on each of said cross bars.

17. The combination in a loom, of an actuating shuttle magnet, a shuttle constituting an armature, and a cushion of rubber or similar material to receive the shuttle at the end of its throw.

18. The combination with a shuttle constituting an armature, of a magnet or magnets fixed with relation to the traverse of the shuttle for reciprocating the same, and a commutator rotating continually in the same direction, as and for the purpose described.

19. The combination with a reciprocating shuttle constituting an armature, of a series of electro-magnetic coils parallel to the shuttle race, and a continuously rotating commutator having the connections repeated any number of times in the circle of rotation but reversed in order at each repetition of the series in the circle of rotation.

20. The combination in a loom, with a shuttle constituting an armature, of a series of actuating magnet coils for actuating the shuttle and a rotary commutator having contacts reversed in order for progressively reciprocating the electrical activity of said coils and provided with a "dwell," as and for the purpose described.

21. The combination with a sectional electro-magnet extending along the shuttle race or path, a shuttle constituting an armature therefor, and a commutator or switch controlling the circuit of the sections for causing a progressive shifting of magnetism along the shuttle race or path, as and for the purpose described.

22. The combination with a series of coils disposed along the shuttle race with their axes parallel to the traverse of said shuttle, a shuttle constructed as an armature, and means for causing a traverse or change of magnetism along the shuttle race.

23. The combination with the shuttle constructed as an armature, of an electro-magnet having a core parallel to the shuttle traverse, and a commutator for changing or varying the current in the coils of said magnet to cause the shuttle to traverse the shed.

24. The combination with a shuttle constructed as an armature, of any number of electro-magnets having their cores disposed parallel to one another and to the shuttle race, as and for the purpose described.

25. The combination with a shuttle constructed as an armature, of any number of electro-magnets having iron cores disposed parallel to one another and to the path of the shuttle, and a commutator or circuit changer for causing a progressive shifting of the zone of activity in said magnet coils, as and for the purpose described.

26. The combination in a loom, of a batten or lay having an iron cross rod or bar parallel to the shuttle race, an electric coil or coils wound on said bar as a core, and a shuttle constituting an armature.

27. The combination substantially as described, with the armature constituting a shuttle and a series of actuating magnet coils, a commutator for connecting in said coils alternately one ahead and one behind thus operating alternately upon the shuttle first at one end and then at the other.

Signed at Lynn, in the county of Essex and State of Massachusetts, this 16th day of March, A. D. 1893.

LEVI W. LOMBARD.

Witnesses:
CHARLES H. STEPHENSON,
JOHN F. NELSON.